UNITED STATES PATENT OFFICE.

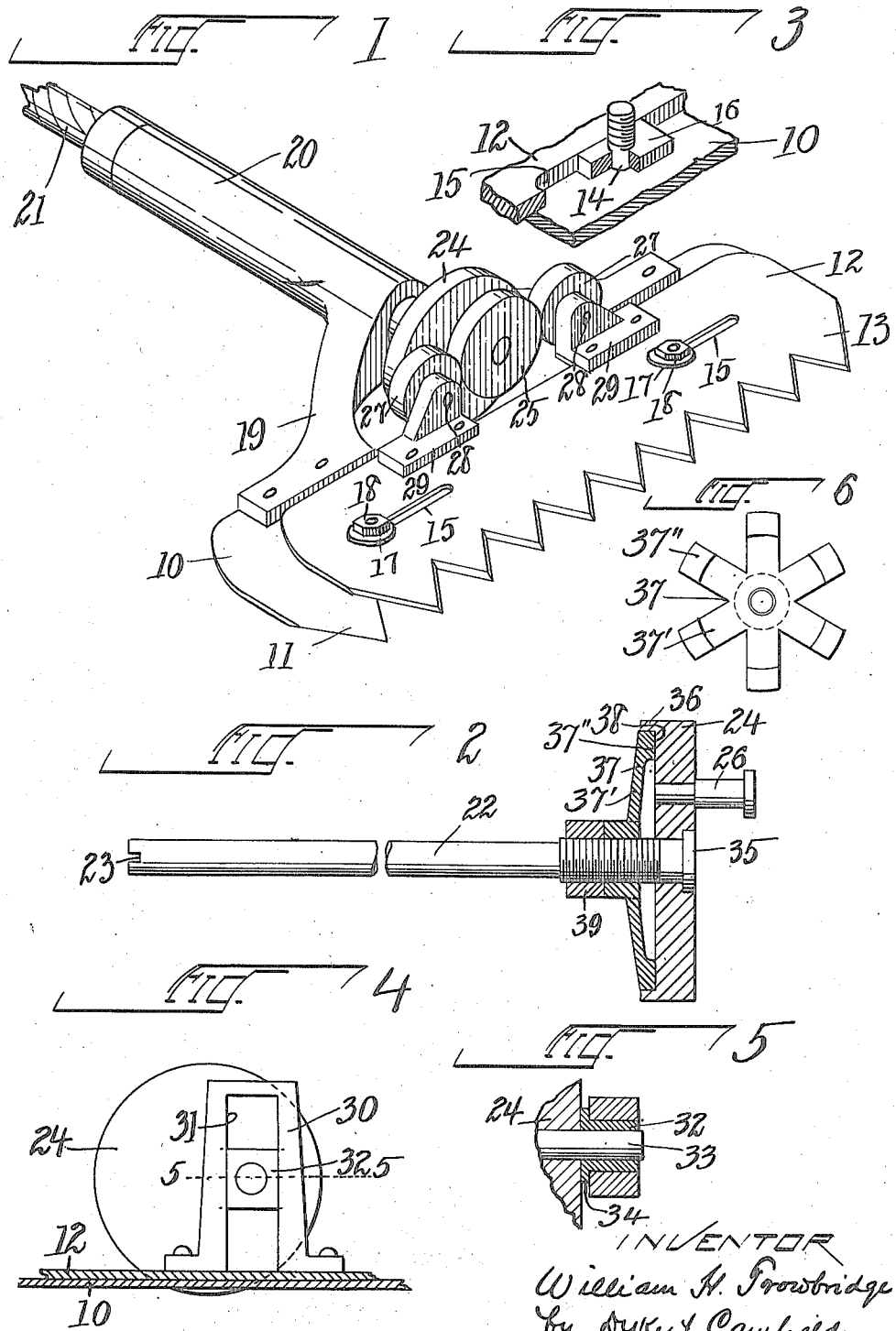
W. H. TROWBRIDGE.
HEDGE TRIMMER.
APPLICATION FILED OCT. 8, 1917.
1,269,880. Patented June 18, 1918.

WILLIAM H. TROWBRIDGE, OF NEWARK, NEW JERSEY.

HEDGE-TRIMMER.

1,269,880.　　　　　Specification of Letters Patent.　　Patented June 18, 1918.

Application filed October 8, 1917.　Serial No. 195,217.

*To all whom it may concern:*

Be it known that I, WILLIAM H. TROWBRIDGE, a citizen of the United States, and a resident of Newark, county of Essex and State of New Jersey, have invented certain new and useful Improvements in Hedge-Trimmers, of which the following is a specification.

My invention relates to hedge trimmers, but apparatus in accordance with my invention may be used for other purposes than for trimming hedges, as for cutting grass, weeds, etc. For the clipping of the rapidly growing wood of hedge plants, such, for example, as privet and the like, a strong substantial apparatus is necessary, and large shears, manually operated with both hands, are usually made use of for this purpose. Such hedge shears are clumsy, require an excessive amount of labor and cannot readily be manipulated to cut in straight lines or regular curves, as is desirable in the upkeep of a well trimmed hedge.

The object of the present invention is the provision of a power operated hedge trimmer of rugged construction adapted for cutting the wood of hedges and which may readily be held with one hand and actuated with accuracy, and with which it is readily possible to cut to a true line.

Another object of the invention is the provision of means whereby an automatic release is provided to prevent breakage of the apparatus, so that if, in the trimming of hedges or the like, the trunk of a plant or an unusually heavy limb is encountered which it is beyond the capacity of the trimmer to cut, the actuating means, as the motor or the like, may still continue to operate while the cutting blades are stationary.

Another object of the invention is the provision of a power motor which is simply and cheaply constructed, will not readily get out of order and which can be easily taken down, as for repairing, sharpening or the like, and reassembled without the necessity of employing skilled labor for the purpose.

In the accompanying drawing forming a part of this specification I have illustrated one embodiment of my invention for the purpose of affording a clear understanding thereof only and not for limitation of my invention in any manner, and in said drawing Figure 1 is a perspective view of one form of trimmer embodying my invention. Fig. 2 is a central sectional view of means for preventing breakage of the cutting knives or tool. Fig. 3 is a fragmentary perspective detail view of a slide member. Fig. 4 is a front view, partly in section, of a part of the cutter blade driving apparatus. Fig. 5 is a transverse sectional view of apparatus shown in Fig. 4 and taken on line 5—5, and Fig. 6 is a detail view of a spring clutch member.

10 represents a stationary cutter blade and 11 the teeth thereon and 12 the movable blade having teeth 13. The teeth 11 and 13 may be formed on the blades 10 and 12 or made separately and secured thereto, as is deemed preferable. Means are provided for guiding the blade 12 on the blade 10 and for holding the same in proper coactive relation, and in the form shown such means comprise bolts 14 secured in the blade 10 and adapted to extend through slots or ways 15 in the blade 12. If desired, a block 16 of material such as tool steel may be placed on the bolts 14 to act as a spacing member for the nuts and to reduce the wear. The washers 17 and nuts 18 serve to hold the blade 12 down to proper position so as to slide on the blade 10 and to secure effective cutting action, there being preferably a slight clearance so as to prevent binding of the parts. The rear edge of the blade 12 preferably contacts with the forward edge of the bracket 19 secured to the blade 10, and when such sliding contact is made the bracket 19 serves as an additional guide for the blade 12, but this is not essential and the feature of guiding the blade 12 by the bracket 19 may be dispensed with if desired. Other means of guiding than those shown may be resorted to. The bracket 19 carries a hollow handle 20 through which the driving action is effected, and the driving is preferably obtained by means of a flexible shaft 21 which is preferably rotated from an electric or gasolene motor, but other rotating means may, of course, be used.

The flexible shaft 21 is connected to the shaft 22 journaled in the handle 20 and the shaft 22 may be provided with a notch or groove 23 for securing the flexible shaft thereto. The shaft 22 serves to rotate the member 24 which, through suitable connection, serves to actuate the slidable blade 12 and to reciprocate the same with respect to the blade 10. The member 24 is preferably made fairly heavy and acts substantially as a fly wheel.

In the drawings two forms of driving means are shown. In Fig. 1 a roller 25 turns on a pin 26 secured eccentrically in the fly wheel 24 and is received between and contacts with rollers 27, 27 spaced apart and mounted for rotation upon the blade 12, as, for example, they may turn on the shafts 28, 28 mounted in angle brackets 29, 29 secured, as by rivets or equivalent means, to the blade 12.

Or the blade 12 may have a vertically slotted member such as the bracket 30 secured thereto and provided with a vertically extending slot 31, and a member of suitable form, such as the block 32, may be received in said slot 31 and may turn upon and be actuated by means such as a pin 33 eccentrically mounted in the fly wheel member 24. When such arrangement is resorted to the block 32 is preferably provided with a head 34 which is interposed between the member 24 and the bracket 30, as shown in Fig. 5, and serves to maintain the parts in accurate relative position. The operating parts, if desired, may be inclosed in a suitable cover (not shown).

Releasable means of connection are provided whereby the shaft 22 may turn even though relative movement of the blades 10 and 12 is prevented as by their encountering a limb or stalk too heavy for the device to cut. By such arrangement breakage of the flexible shaft, trimming knives or other parts of the apparatus is prevented and the motor may still continue to run even though the blades are not operated. In the form shown the shaft 22 is provided with a head 35 which serves to hold the fly wheel member 24 on the shaft 22, and the member 24 is provided with a projecting flange 36 within which is received a member 37 which preferably fits substantially closely within the recess 38 provided in the member 24 by means of the extension 36, and said member 37 is secured in place upon the shaft 22 by any suitable means, which means are preferably adjustable, as, for example, the member 37 may be threaded on the shaft 22 and locked in place by means of a lock nut 39 also threaded on the shaft 22. The member 37 is preferably so constructed that it may yield somewhat under pressure. For example, it may comprise a number of spring fingers 37′ having substantially flat bearing surfaces 37″ at their outer ends. The parts are adjusted in the assembly of the device so that the member 37 presses against the member 24 with sufficient force so that all the parts on the shaft 22 turn together until great resistance is encountered to the movement of the blade 12 with respect to the blade 10, as by attempting to cut through a large limb or stalk, and upon the blade 12 being stopped by such extraordinary resistance, the shaft 22 and the member 37 may continue to turn without imparting rotation to the member 24 and consequently without actuating the cutting knives. As soon as the resistance is removed, as by withdrawing the tool from contact with the resisting object, the member 24 begins revolving again and the whole apparatus operates as before.

Should the frictional contact between the members 37 and 24 be decreased to such an extent that slippage occurs under ordinary operating conditions, it will, of course, be readily possible to secure the necessary greater frictional contact therebetween by loosening the lock nut 29, screwing up the member 37 into somewhat tighter contact with the member 24 and then resetting the lock nut, as will be readily understood. While the releasable driving means for preventing breakage of the tool or stopping of the motor is shown in Fig. 2 for connection with the actuating means illustrated in Fig. 1, it will, of course, be apparent that the same or equivalent means for preventing breakage may be utilized in connection with the actuating means of Fig. 4 or with still different forms of actuating devices.

The operation of a trimmer in accordance with my invention will be readily understood from the foregoing. The shaft 21 being connected to a suitable means for imparting rotation thereto, such as an electric or other motor, it is only necessary to grasp the apparatus with one hand by the handle 20, by means of which it may be accurately guided for securing straight or curved lines or the most intricate surfaces, as may be desired. Should an obstacle be encountered which can not be cut by the trimmer, no breakage or other trouble results, but until the device has been removed from the obstacle or vice versa, the shaft 22 is permitted to rotate with respect to the member 24 by reason of the frictional contact between the member 37 and the member 24, and as soon as the obstacle preventing the cutting action has been removed, the blades can take up their cutting movement as if nothing had happened.

It will be seen that a trimmer in accordance with my invention presents a number of features of advantage. It is simple and cheap to construct, the parts are all exposed and readily accessible for any needed attention, as repairing, lubrication and the like, and may be readily taken apart for sharpening or the provision of new teeth if separate teeth are used, and may be reassembled readily and without difficulty. It will be noted that the construction shown in Figs. 4 and 5, as well as that shown in Fig. 1, lends itself to such ready taking down and replacement, the blade 12 in either case when freed, as by unscrewing the nuts 18, being entirely free and capable of being removed without further obstruction. After the projecting parts or branches of a hedge or the like are cut off they may be readily thrown aside by a slight movement of the trimmer, and the hedge is left entirely clean with no necessity of picking off the trimmed shoots by hand. Other features of advantage have already been referred to.

It is to be understood that the embodiments of my invention shown and described are intended for the purpose of affording a clear understanding of my invention only, and that I am not to be limited to such specific form or forms shown except as is required by my claims by which the scope of my invention is defined, and that numerous changes in and departures from the precise construction shown may be resorted to without departing from my invention or sacrificing any of its advantages.

I claim:

1. In a trimming tool, a pair of toothed blades, one whereof is adapted to be reciprocated relative to the other, and means including a fly wheel and a driving member comprising spring fingers adapted to engage said fly wheel for releasably imparting reciprocatory movement to the movable blade.

2. In a trimming tool, a fixed toothed blade, a second toothed blade mounted on the first for reciprocatory movement with respect thereto, a handle bracket on the fixed blade, and means supported by said handle and including a fly wheel and a releasable driving means for imparting reciprocatory movement to the movable blade.

3. In a trimming tool, a fixed toothed blade and a reciprocable toothed blade, a handle bracket on the fixed blade, said handle being provided with a longitudinal bore, a shaft mounted for rotation in said handle, a fly wheel on said shaft, a roller eccentrically mounted on said fly wheel, a pair of rollers mounted on the reciprocable blade and between which the roller on the shaft is interposed, and a flexible shaft secured to said first named shaft for imparting rotative movement thereto.

4. In a trimming tool, a pair of toothed blades, one fixed and the other reciprocable with respect thereto, the reciprocable blade having a pair of separated rollers thereon, and the fixed blade having a handle bracket secured thereto and provided with a bore, rotatable means mounted to turn in the bore of the handle and comprising a fly wheel, and a roller eccentrically mounted thereon and adapted to be interposed between the two rollers upon the movable blade.

5. In a trimming tool, a handle, a fly wheel thereon, a pair of relatively reciprocable cutting blades thereon, means actuated from said fly wheel for causing relative reciprocatory movement of said blades, a flexible shaft extending out from said handle and adapted to rotate said fly wheel, and releasable driving means between said flexible shaft and fly wheel.

In testimony that I claim the foregoing, I hereto set my hand, this 5th day of October, 1917.

WILLIAM H. TROWBRIDGE.